United States Patent
Gundlach et al.

(10) Patent No.: US 6,192,584 B1
(45) Date of Patent: Feb. 27, 2001

(54) METHOD FOR MANUFACTURING A STRUCTURAL MEMBER FOR COLLISON IMPACT

(75) Inventors: Peter Gundlach, Raufoss; Ronald H. Pedersen, Gjovik, both of (NO)

(73) Assignee: Hydro Raufoss Automotive A/, Raufoss (NO)

( * ) Notice: Subject to any disclaimer, the term of this patent is extended or adjusted under 35 U.S.C. 154(b) by 0 days.

(21) Appl. No.: 09/269,307

(22) PCT Filed: Sep. 24, 1997

(86) PCT No.: PCT/NO97/00261

§ 371 Date: Jul. 23, 1999

§ 102(e) Date: Jul. 23, 1999

(87) PCT Pub. No.: WO98/14285

PCT Pub. Date: Apr. 9, 1998

(30) Foreign Application Priority Data

Oct. 1, 1996 (NO) .................................................. 964154

(51) Int. Cl.$^7$ .................................................. B21D 53/88
(52) U.S. Cl. .................. 29/897.2; 29/897.3; 29/897.312; 29/897.33; 72/735.1
(58) Field of Search ................................. 29/897.2, 897.3, 29/897.31, 897.312, 897.33, 513, 557; 293/102, 120; 52/735.1, 720.1; 72/254, 256

(56) References Cited

U.S. PATENT DOCUMENTS

| | | | |
|---|---|---|---|
| 625,427 | * | 5/1899 | Stewart et al. ........................ 29/897.3 |
| 3,823,524 | * | 7/1974 | Weinstein ........................... 29/897.312 |
| 4,078,288 | * | 3/1978 | Abramson ........................... 29/897.312 |
| 4,160,561 | * | 7/1979 | Farnam et al. ........................ 293/102 |
| 4,236,473 | * | 12/1980 | Belt ................................. 29/897.312 |
| 4,252,355 | | 2/1981 | Goupy et al. . |
| 4,348,042 | * | 9/1982 | Scrivo .................................. 293/120 |
| 4,830,416 | * | 5/1989 | Matsuoka .............................. 293/120 |
| 5,078,439 | * | 1/1992 | Terada et al. .......................... 293/122 |
| 5,100,187 | * | 3/1992 | Loren .................................. 293/122 |
| 5,114,522 | * | 5/1992 | Takado et al. ......................... 293/122 |
| 5,154,462 | * | 10/1992 | Carpenter ............................. 293/120 |
| 5,163,225 | * | 11/1992 | Goleby ................................. 29/897.3 |
| 5,507,540 | | 4/1996 | Pernot . |
| 5,577,796 | | 11/1996 | Clausen . |

FOREIGN PATENT DOCUMENTS

| | | |
|---|---|---|
| 24 40 708 | 3/1976 | (DE) . |
| 0 234 611 | 9/1987 | (EP) . |
| 2 508 398 | 1/1985 | (FR) . |
| 2 741 413 | 5/1997 | (FR) . |
| 1 387 354 | 3/1975 | (GB) . |
| 1 519 784 | 8/1978 | (GB) . |
| 912454 | 12/1991 | (NO) . |
| 92/11163 | 7/1992 | (WO) . |

OTHER PUBLICATIONS

JP Abstract only (JP 63–16809), vol. 12, No. 218 (M–711); Showa Alum Corp. Jan. 23, 1998.

* cited by examiner

Primary Examiner—I Rosenbaum
Assistant Examiner—Trinh Nguyen
(74) Attorney, Agent, or Firm—Larson & Taylor PLC

(57) ABSTRACT

A method for manufacturing a structural member (1), especially a vehicle assembly member serving to absorb collision energy and forces by direct or indirect collision impact, for the purpose of obtaining a deformation body which is processed from an extruded blank. The post-processing of the blank is provided without supplementing further parts, and the blank can be given various geometrical designs for variation of stiffness and energy absorbing properties of the finished structural member. There is provided a substantially extruded blank (1) having a first yoke portion (2) and one or more leg portions (3A, 3B) protruding from the yoke portions; and in the area between the yoke portion (2) and the leg portions (3A, 3B), there is effected a cutting along a certain extension, such that in a leg zone (3Z) extending from the bottom of the cutting (4a, 4b, 5a, 5b) and outwardly along a leg portion there is effected a bending for providing one or more reinforcing collision corners (6a–6d).

6 Claims, 5 Drawing Sheets

METHOD FOR MANUFACTURING A STRUCTURAL MEMBER FOR COLLISON IMPACT

FIELD OF THE INVENTION

The present invention relates to a method for manufacturing a structural member, especially a vehicle assembly member serving to absorb collision energy and forces by direct or indirect collision impact.

PRIOR ART

From De 2440780 (Klie/The Daimler-Benz) there is known a bumper for a vehicle wherein is used a hollow plastic profile connected to a supporting member, which in turn is provided with anchoring means which can directly be included in the plastic member.

From FR 2508398 (Huber/Daimler-Benz) there is know a bumper for a vehicle, comprising a bending-stiff supporting element taking the form of an I-beam or similar, which is attached to a vehicle by means of an attachment element. On its front side the supporting member carries an energy absorbing material surrounded by a housing of elastic and hard material which at its end portion is anchored in appropriate holding means allowing a certain displacement of the elastic member before the absorption of the collision energy is received by the stiff beam.

GB 1387354 (Molina et al) relates to a bumper for vehicles, wherein is used a box-similar structure having T-shaped tracks along the four corners thereof, adapted to connection means for connection to the car structure itself.

WO 92/11163 (Krays/Audi) discloses a deformation body for car bumpers, wherein the body is manufactures from extruded aluminium and welded to a supporting area of the car bumper. When replacing the supporting unit an element of the holding means can be removed, for thereby giving access to another support element which is arranged in a shorter recess.

From NO 912454 (Lamprechthausen) there is know a bumper body, especially for vehicles, comprising a substantially cylindrical basis body arranged in the longitudinal direction of the bumper body and comprising an area of approximately radially surrounding ribs, which area on the one side is limited by a bumper attachment and on the other side by a flange or console surrounding the outer side of said basis body.

What is common for the elements or structural members discussed in said publications, is that they comprise extruded individual parts, but are silent about giving instructions for how these extruded individual parts in an effective and rational way can be processed in order to achieve improved properties as deformation bodies.

OBJECTS OF THE INVENTION

An object of the present invention is to give instructions for manufacturing a structural member, especially a deformation body for vehicles, and specifically cars, wherein the structural member is manufactured from a pre-extruded metal blank or profile.

A second object of the present invention is to give instructions for a structural member which in the further processing of an extruded metal blank can be used as an energy absorbing unit between bumper and main structure of a vehicle, especially for absorbing collision energy and forces corresponding to the kinetic energy of the vehicle up to for example 15 km/h.

Yet another object of the present invention is to provide a deformation body wherein the postprocessing of said blank is realised independent of supplying further parts, namely by initially using the profile or the sectional form of the blank itself.

Still another object of the present invention is to provide a processing technique wherein the processing of only one individual blank can determine the degree of stiffness and the degree of energy absorption of the finished processed blank.

A further object of the present invention is to adapt the basic shape of the blank to the subsequent processing for achieving optimum results.

BRIEF DISCLOSURE OF THE INVENTION

There objects are achieved in a method of the type as stated in the preamble, which according to the invention is characterized in that there is provided a substantially extruded blank comprising a first yoke portion and one or more leg portions protruding from said yoke portion, and that in the area between the yoke portion and said leg portions there is effected a cutting along a certain extension, and that in the leg zone extending from the bottom of the cutting and outwardly along a leg portion there is effected a bending for providing one or more reinforcing collision corners.

Thereby is achieved the advantage, in relation to prior art, that one avoids joining problems and extra logistic during the production.

It is to be understood that along one or more of the leg zones there may be effected one or more bendings, all in dependence upon the wanted achievable result.

After the bending along the individual leg zones has been effected the cut ends of the respective leg zone may appropriately be attached to the yoke portion.

An appropriate embodiment is to the fact of adapting the cutting length and the bending such that the outer edges of the leg zones will meet for the provision of a cavity, and that said outer edges are attached to each other.

In this manner it is possible by processing one and same extruded metal piece to provide an absorption body which is adapted to a vehicle, at the same time as one can define deformation characteristics by pressure loading, design the shape of the yoke used as mounting plate independent of the design of the remaining deformation blank, and avoid the addition of further small parts and complicating production and welding processes.

Further objects and advantages of the present invention will appear from the following description taken in conjunction with the appending drawings.

BRIEF DISCLOSURE OF THE DRAWINGS

DESCRIPTION OF EMBODIMENTS

Figure 1:
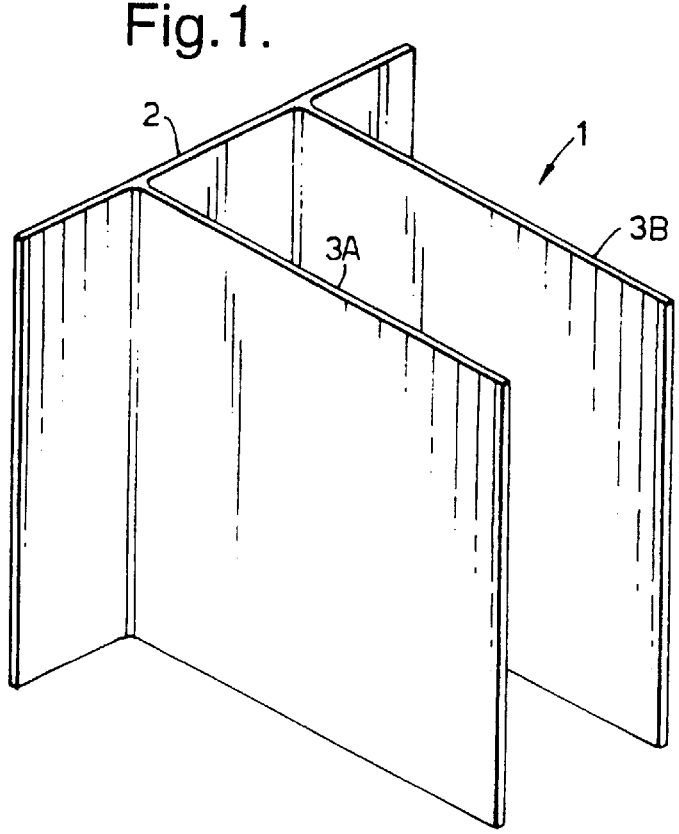
FIG. 1 is a schematical perspective view of a first embodiment of an extruded blank which can be used in the method of the present invention, comprising a first yoke portion and two leg portions protruding from said yoke portion.

In FIG. 1 there is schematically illustrated a perspective view of a preferably extruded blank which generally is designated by reference numeral 1, and which can be extruded aluminium or another appropriate material or mixtures thereof.

The example of blank 1 illustrated in FIG. 1 comprises generally a first yoke portion 2 and two leg portions 3A and 3B, respectively, protruding from said yoke portion 2. It is to be understood that prior to the processing of the blank in a method according to the invention, said blank 1 can be cut to a suitable length, for example from running lengths of extruded aluminium.

Figure 2:
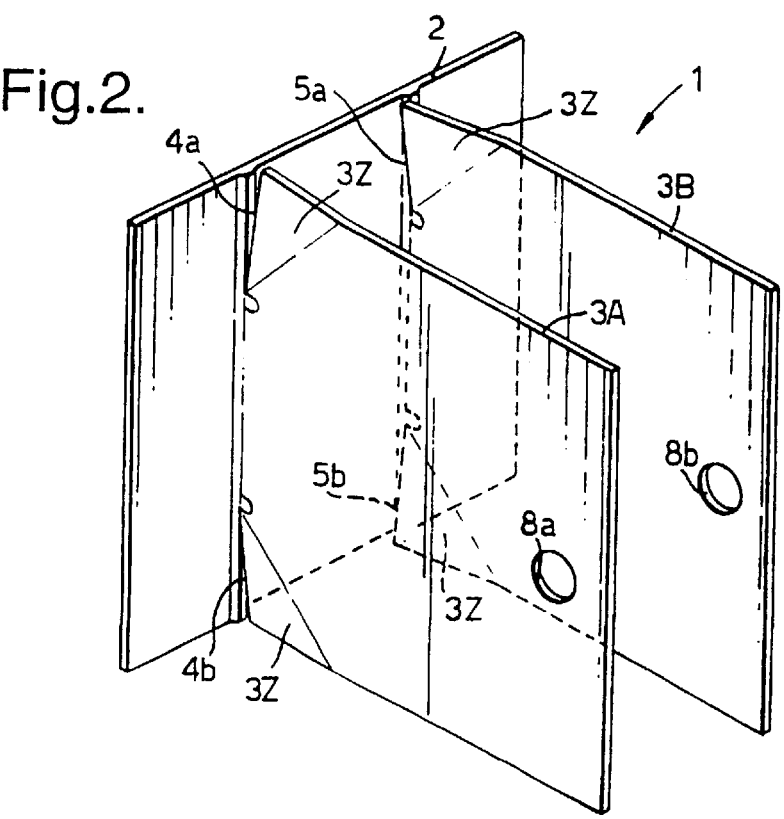
FIG. 2 is a perspective view similar to FIG. 1, and illustrates the introductory processing of the blank, namely by effecting a cutting in the area between the yoke portion and the leg portion and a moderate inwardly bending of the leg zones.
Figure 3:
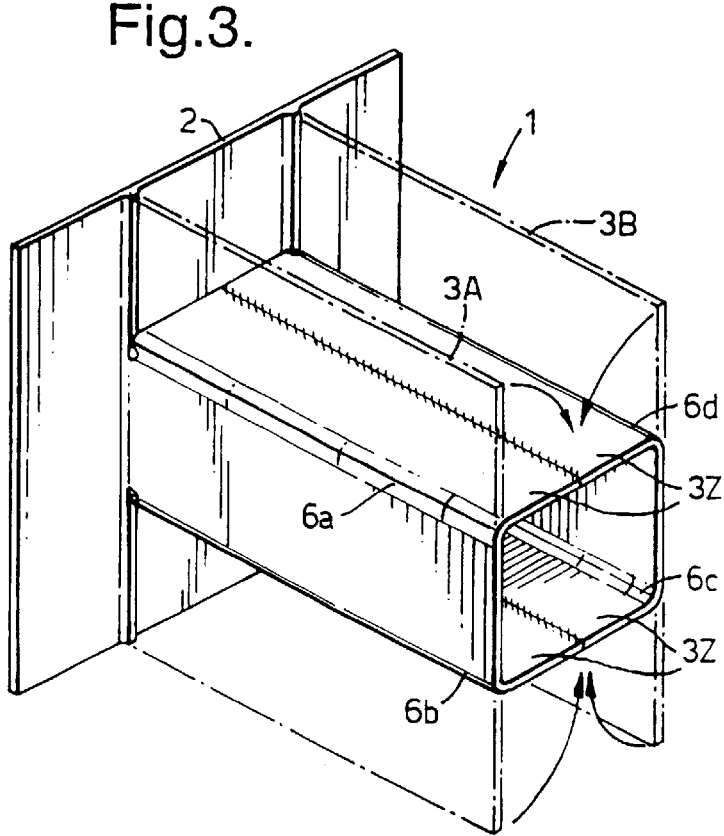
FIG. 3 is a perspective view similar to FIGS. 1 and 2, and illustrates the further processing of the blank, namely by illustrating that in the leg zones extending from the bottom of the respective cuttings and outwardly along the leg portions there is effected bending for providing one or more reinforcing collision corners.

A first working step according to the invention is to the fact that, as appearing from FIG. 2, in the area between the yoke portion 2 and the respective leg portions 3A and 3B, there is effected cutting over a certain extension, which involves that in the embodiment illustrated in FIG. 2 there is effected four cuttings 4a, 4b and 5a, 5b, respectively. Further, the method according to the invention is to the fact that, as this more clearly appears in FIG. 3, in a leg zone 3Z extending from the bottom of said cuttings 4a, 4b and 5a, 5b and outwardly along respective leg portions 3A and 3B, there are effected bendings for the provision of one or more reinforcing collision corners, here four corners 6a–6d, respectively.

Figure 4:
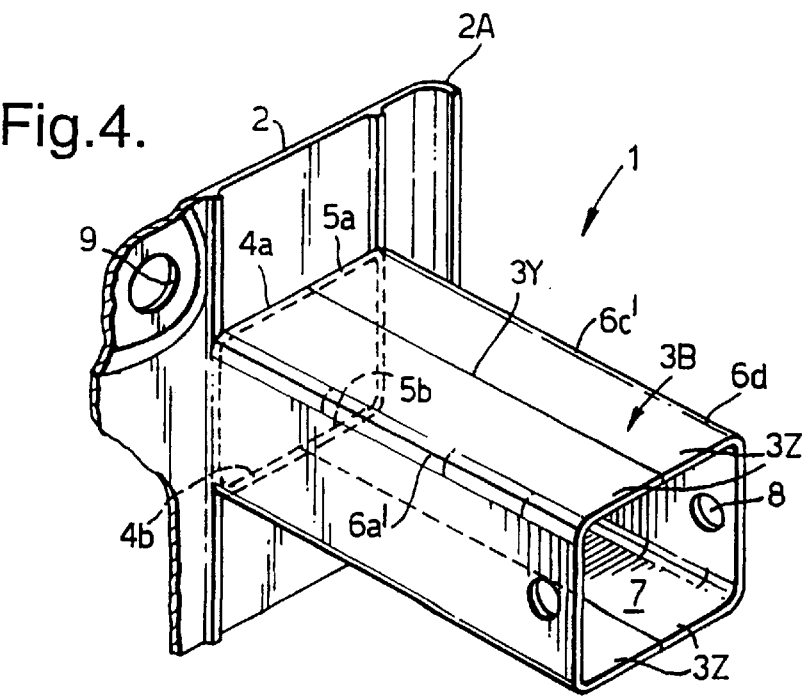
FIG. 4 is a perspective view illustrating a variant of the finished processed blank, wherein the bent leg portions abut each other along the outer edges thereof for providing a cavity, or box-shape.

In FIG. 4 there is illustrated a finished bent blank 1, and herefrom it appears that after bending along the individual leg zone 3Z, the respective cut ends 4a, 4b and 5a, 5b will possibly be attached to the yoke portion 2. Since the cutting lengths 4a, 4b and 5a, 5b and the bending lines 6a'–6d' are adapted so that the outer edges 3Y of the respective leg portions 3Z will meet, the same will by a possible joining define a cavity or a box 7, and then a deformation box having appropriately defined deformation criteria upon pressure loading. These deformation characteristics will be result of the initial form of the blank 1, which form, of course, may vary within wide ranges, as this will be discussed in connection with further embodiments.

Further, it is to be understood that the discussed leg portions 3A and 3B may prior to said bending operation be processed to comprise attachment means, for example mounting holes 8a, 8b, see FIG. 1 and FIG. 4.

Further, it is to be understood that also the yoke portion 2 may be processed prior to or after the bending operation, for example by comprising attachment means, for example mounting holes 9 as illustrated as an example in the embodiment according to FIG. 4.

From the embodiment illustrated in FIG. 4 it also appears that the yoke 2 is provided with not only attachment holes 9 but also with appropriate flanges 2a which either may constitute a part of the extruded blank 2, or be processed simultaneously with said bending of the leg portions.

As stated in the preamble, such a structural member as manufactured according to the invention and illustrated in FIG. 4, may be used specifically as a deformation body or as an energy absorbing unit between a bumper and the main structure of a vehicle, especially in cases where the energy which is necessary for deforming the body corresponds to a kinetic energy of the vehicle when this is at speed of for example 15 km/h.

The top load related to such a deformation body will be dependent upon the number of corners being hit at the same time during a collision. This involves that by varying the number of bendings in the leg zone and the shape of the end portions of said leg zones this will render different geometric end products which can be adapted to the expected collision conditions, possibly the various designs of the associated bumpers and car models.

Figure 5:
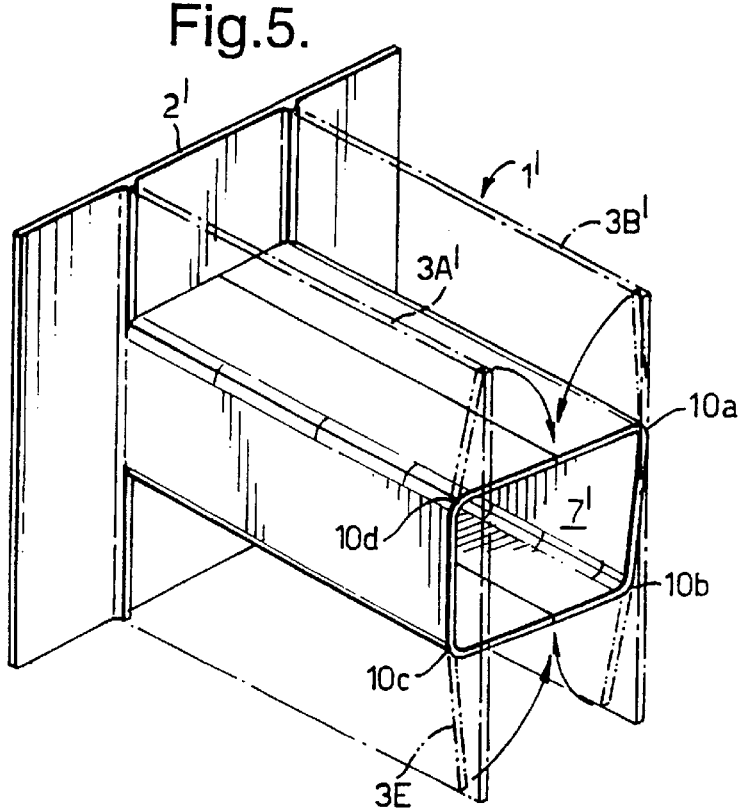
FIG. 5 is a perspective view illustrating a variant of a blank to be used in the present method, wherefrom it appears varying shapes of the end edges of the leg portions.

In FIG. 5 there is illustrated a variant of a blank 1' which have two leg portions 3A' and 3B' protruding from a yoke portion 2' and prior to bending having their end edges 3E cut in a specific manner, which involves that the finished bent cavity 7' will have its corner end portions 10a–10d, here four corner portions, arranged in an "oblique" plane in relation to the main plane of the yoke portion 2', and with the corner end portion 10a at an outermost distance therefrom.

Figure 6:
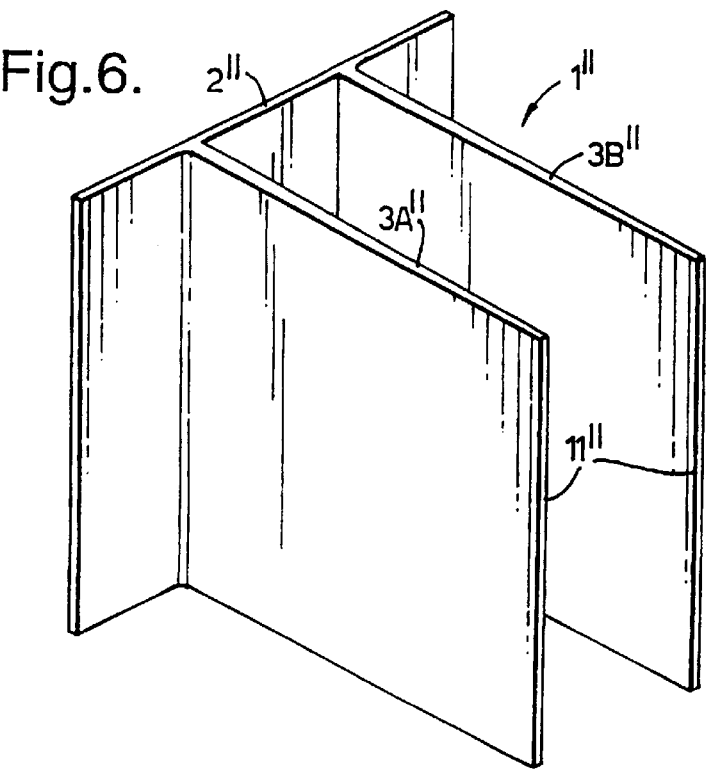
FIG. 6 is yet another embodiment of an extruded blank according to the invention, here with leg portions having varying wall thickness.

The deformation load will also be dependent upon the wall thickness of the initial blank 1", and in the embodiment illustrated in FIG. 6 there is illustrated leg portions 3A" and 3B" wherein the wall thickness is relatively large in the proximity of the yoke portion 2" and diminishing towards the end edges 11" of the leg portions.

It is to be understood that the average deformation load can be varied and respectively optimised by changing the wall thickness of the leg portions, all of which being compared with the other dimensions of the blank and the geometry of the finished end product.

It is further to the understood that the deformation load not only can be regulated by means of the general wall thickness of the leg portions, but specifically by regulating the wall thicknesses of the bent corners, either by providing reinforced portions or weakened portions.

Figure 7:
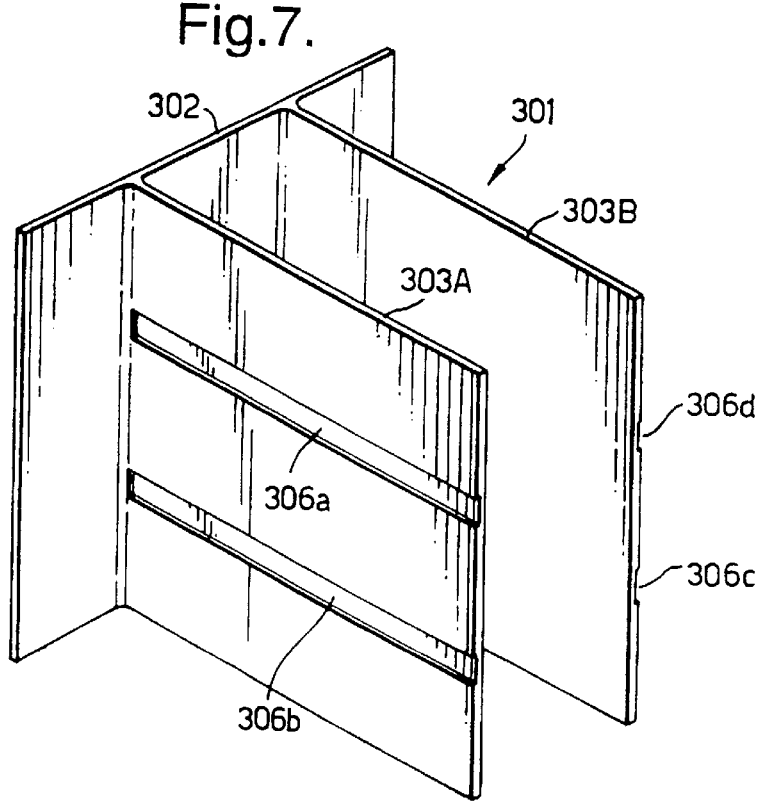
FIG. 7 is a perspective view of still another embodiment of a blank according to the invention, here with leg portions with weakening zones.

In FIG. 7 there is illustrated an embodiment of a blank 301 which is provided with leg portions 303A and 303B which at appropriate positions have been provided with weakening portions 306a–306d which preferably will be in line with the corresponding corners after the finished treatment of the blank.

Figure 8:
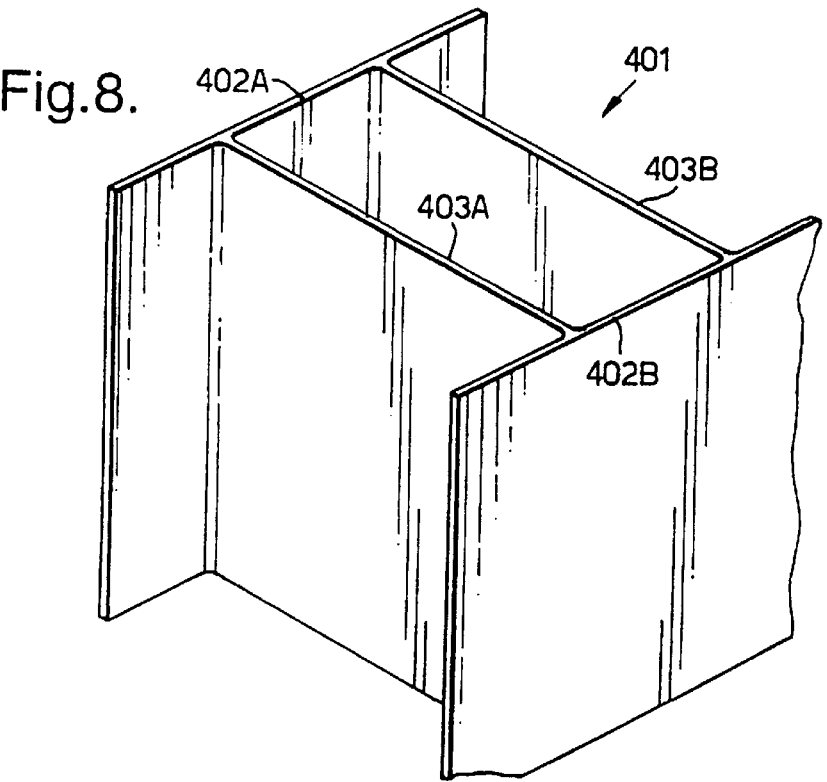
FIG. 8 illustrates still another variant of an embodiment of a blank which can be used in the method according to the invention, comprising a first and second yoke portion and two leg portions extending therebetween.

In FIG. 8 there is illustrated a variant of blank 401 comprising a first yoke portion 402A and a second yoke portion 402B both having a substantially flat main portion, as well as two leg portions 403A and 403B extending therebetween.

In FIGS. 9A–9G there is illustrated variants of cross sectional profiles of blanks which can be used in the method according to the present invention.

Figure 9A:
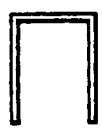
FIGS. 9A–9G illustrate variants of sectional shapes of various types of profile blank which can be used in the method according to the present invention.
Figure 9B:
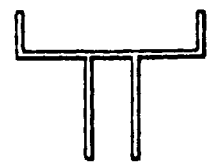
Figure 9C:
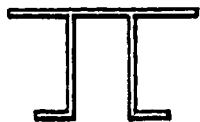
Figure 9D:
Figure 9E:
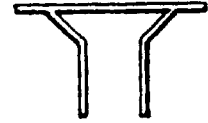

In FIGS. 9A–9E there is generally illustrated a blank comprising a first yoke portion having a substantially flat main portion, which main portion may join directly with two protruding leg portions, as this is illustrated in FIG. 9A, or which yoke portion may protrude beyond the area of the two leg portions, as this is illustrated in FIGS. 9C–9D and 9E.

Possibly, as this is illustrated in FIG. 9B, the first yoke portion may not only protrude beyond the area of the leg portions, but also be provided with wings or flanges along one or more of the rim zones of the main portion.

Figure 9F:

In FIGS. 9A–9C and FIG. 9F it is illustrated that two leg portions protruding from the yoke portion may be substantially straight, as this is particularly illustrated in FIGS. 9A, and 9B, and substantially parallel, possibly be straight but extending obliquely in relation to each other, as this is illustrated in FIG. 9D, possibly with buckled, bent or knuckled portions, as this is illustrated in respectively FIG. 9C wherein the end portions of the leg portions are bent outwardly, whereas FIG. 9E illustrates leg portions having first inwardly protruding leg areas merging into straight parallel outer leg areas, and FIG. 9F illustrates parallel leg portions which are bent inwardly at their end areas.

Figure 9G:
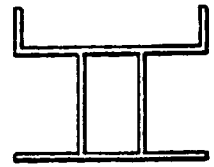

In FIG. 9G there is illustrated a blank comprising a first yoke portion and two leg portions protruding from the yoke portion, as well as a further yoke portion arranged in the area of the end edges of the end portions, and here as a closed sectional form, whereas the remaining cross sectional forms as illustrated in FIGS. 9a–9f illustrate completely or partly open cross sectional forms.

What is claimed is:

1. A method for manufacturing a reinforced structural member comprising the steps of:
    obtaining a substantially extruded blank having a yoke portion and at least one leg portion protruding from the yoke portion;
    cutting, in an area between the yoke portion and the at least one leg portion, along an extension such that a leg zone of the at least one leg portion extending from a cut end and outwardly along the at least one leg portion is separated from the yoke portion; and
    bending the leg zone relative to a remainder of the at least one leg portion to produce a reinforcing corner at the intersection of the leg zone and the remainder of the at least one leg portion.

2. A method for manufacturing a reinforced structural member as claimed in claim 1, and further including the step of attaching the cut end of the at least one leg portion to the yoke portion after said bending step.

3. A method for manufacturing a reinforced structural member as claimed in claim 2:
    wherein there are first and second leg portions protruding from the yoke portion;
    wherein said cutting step effects a cut end at both outer edges of both of the first and second leg portions;
    wherein said bending step includes the step of aligning associated outer edges of the first and second leg portions adjacent one another such that a cavity is formed with the first and second leg portions; and
    further including the step of attaching associated outer edges of the first and second leg portions to one another.

4. A method for manufacturing a reinforced structural member as claimed in claim 1, wherein the extruded blank includes a first yoke portion, two leg portions protruding from the first yoke portion, and a second yoke portion located at outer ends of the leg portions.

5. A method for manufacturing a reinforced structural member as claimed in claim 1, wherein the extruded blank includes one of reinforced portions and weakened portions along an intersection of the leg zone and the remainder of the leg portion.

6. A method for manufacturing a reinforced structural member as claimed in claim 1:
    wherein there are first and second leg portions protruding from the yoke portion;
    wherein said cutting step effects a cut end at both outer edges of both of the first and second leg portions;
    wherein said bending step includes the step of aligning associated outer edges of the first and second leg portions adjacent one another such that a cavity is formed with the first and second leg portions; and
    further including the step of cutting at least a portion of an end edge opposite to the cut end of at least one of the first and second leg portions such that the cavity has at least one end corner portion after said bending step at a different distance from the yoke portion than another corner portion.

* * * * *